(12) United States Patent
Teal et al.

(10) Patent No.: US 8,069,079 B1
(45) Date of Patent: Nov. 29, 2011

(54) CO-LOCATION OPPORTUNITY EVALUATION

(75) Inventors: Benjamin T. Teal, Charlotte, NC (US); Catherine R. Zalatoris, Plano, TX (US); Charles V. Kosior, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 401 days.

(21) Appl. No.: 12/350,350

(22) Filed: Jan. 8, 2009

(51) Int. Cl.
*G06Q 10/00* (2006.01)
(52) U.S. Cl. .................. 705/7.36; 705/7.11; 705/7.12
(58) Field of Classification Search .............. 705/7.36, 705/7.11, 7.12
See application file for complete search history.

(56) References Cited

U.S. PATENT DOCUMENTS

| | | | | |
|---|---|---|---|---|
| 4,642,780 A | * | 2/1987 | Thomson | 703/1 |
| 6,112,184 A | * | 8/2000 | O'Brien, Jr. | 705/5 |
| 6,301,516 B1 | * | 10/2001 | Ostrowski et al. | 700/109 |
| 2005/0171877 A1 | * | 8/2005 | Weiss | 705/35 |
| 2006/0161447 A1 | * | 7/2006 | O'Hollearn et al. | 705/1 |
| 2007/0255707 A1 | * | 11/2007 | Tresser et al. | 707/6 |
| 2008/0263491 A1 | * | 10/2008 | Foltz et al. | 716/8 |

OTHER PUBLICATIONS

Liggett, Robin. "Automated facilities layout: past, present and future." Automation in Construction. 9.2 (2000): 197-215.*

* cited by examiner

*Primary Examiner* — Beth V Boswell
*Assistant Examiner* — Darlene Garcia-Guerra
(74) *Attorney, Agent, or Firm* — Weiss & Arons LLP; Michael Springs

(57) ABSTRACT

It is an object of this invention to provide apparatus and methods for electronically evaluating a pair of entities as candidates for co-location. The apparatus and methods may be used to define a group of entities for co-location assessment. A pairing within the group may be quantitatively evaluated based on a variety of criteria to assess suitability for co-location. The evaluations may be combined to generate a co-location score which may be displayed pictorially in a co-location matrix.

12 Claims, 3 Drawing Sheets

CO-LOCATION OPPORTUNITY EVALUATION

FIELD OF TECHNOLOGY

Aspects of the disclosure relate to workspace management. In particular, the disclosure relates to assessing the degree to which two entities may benefit from sharing workplace resources.

BACKGROUND

Businesses or other entities may benefit from locating near each other within a building or on a floor. In many cases, common infrastructure and equipment may be shared. If the operations of the two entities are similar, workspace as well as employees may be shifted from one entity to another as an enterprise grows, declines or changes focus. This strategy allows a growing business to adapt to changes with minimal effort and expense. For a business that is temporarily declining, it may preserve a cadre of trained employees who may be shifted back as the business recovers.

For any group of entities, some pairs will be better-matched than others for co-location. Conventionally, planners make decisions regarding co-location based on a personal assessment. Typically, only a small set of criteria are considered and the criteria may not be the same in every case.

There is no known approach that evaluates candidates for co-location using an unbiased mathematical framework. An electronic system could quickly reduce a broad set of criteria to mathematical terms for processing to assess suitability for co-location. Moreover, an electronic system could evaluate a group of entities together, assessing each paring in a consistent way and producing quantified results.

It would be desirable, therefore, to provide apparatus and methods for electronically evaluating a pair of entities as candidates for co-location.

SUMMARY OF THE INVENTION

It is an object of this invention to provide apparatus and methods for electronically evaluating a pair of entities as candidates for co-location. Apparatus and methods for electronically generating a co-location score for a pair of entities are therefore provided.

The apparatus and methods may be used to define a group of entities for co-location evaluation. An entity may be paired computationally with another entity in the group for a co-location assessment. A co-location score may be determined for each pairing.

The co-location score may be determined by quantifying co-location suitability in three general areas: compliance, correlation and compatibility. The resulting values may be combined to calculate a co-location score.

The co-location scores for each pairing in the group of entities under evaluation may be displayed pictorially in a co-location matrix.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
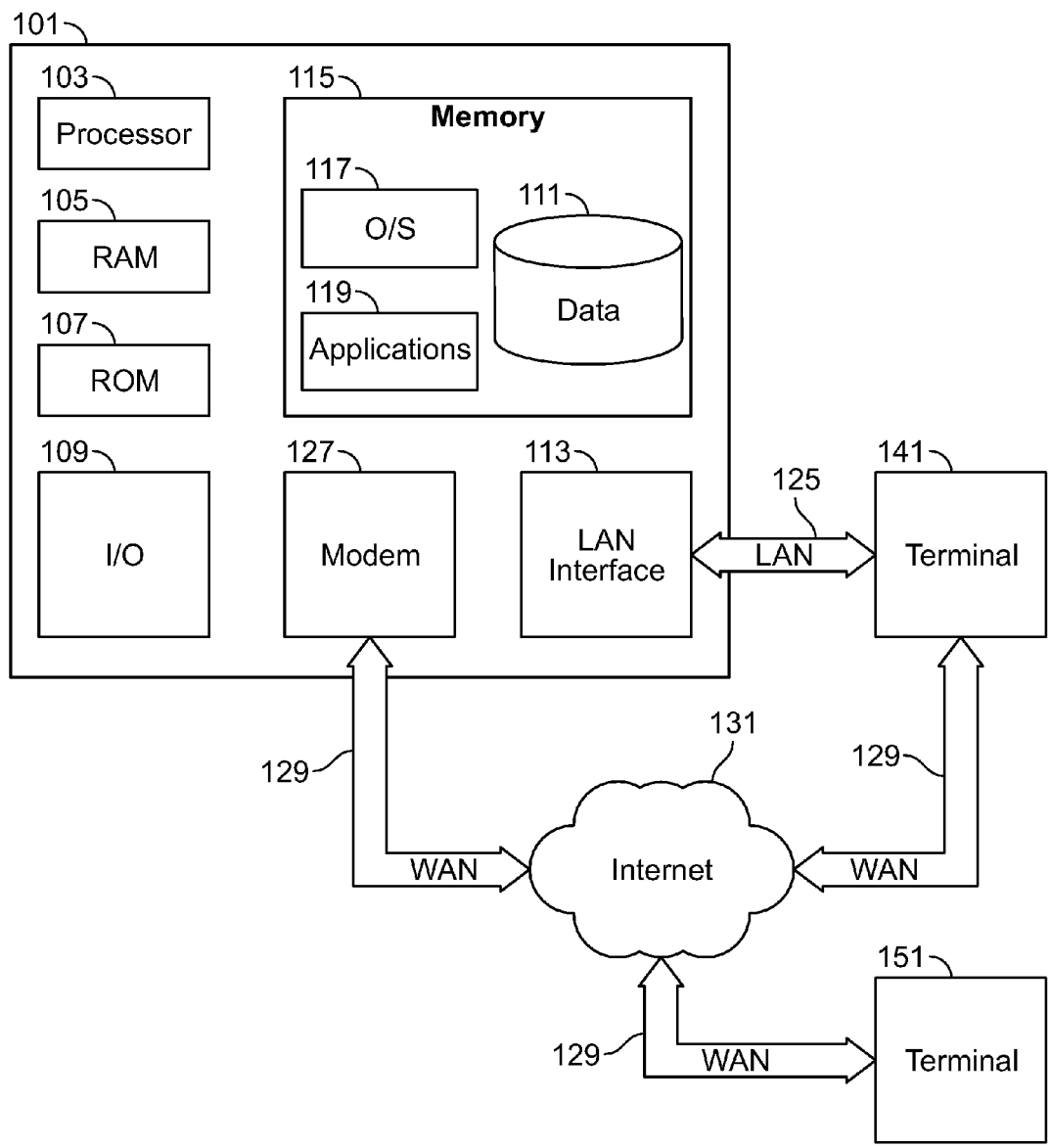
FIG. 1 shows a schematic diagram of apparatus that may be used in connection with the principles of the invention.

Apparatus and methods for electronically evaluating a pair of entities as candidates for co-location are provided.

Locating a pair of businesses or other entities in the same building or on the same floor may allow them to economize by sharing resources. If the two entities operate in similar ways, workspace and employees may also be transferred as needed between the two. This strategy may provide streamlined expansion for a growing business and may preserve trained workers for a business in a temporary decline. Adjustments for a business changing its focus are may be simplified if the resources of a co-located business are available. Co-location may also simplify career pathing for employees by making it easy to move to a more prestigious neighboring organization.

Co-location assessment may be particularly valuable for a large business encompassing several different lines of business. For example, lines of business within a bank such as call centers for credit card servicing, deposits, mortgage servicing and investment management may have overlapping resource needs and skill sets for their employees. Matching the lines of business which can best take advantage of co-location results in the greatest cost savings for the larger business.

For any group of entities, some pairs will be more suited for co-location than others. The invention may provide apparatus and methods that define a group of entities for co-location assessment. An entity within the group may then be evaluated for co-location suitability with one or more of the other entities in the group.

The invention may apply the apparatus and methods to assess co-location suitability based on a variety of criteria. The evaluations may be combined to generate a co-location score which may be displayed pictorially in a co-location matrix.

The co-location score, Q, for a pair of entities may be calculated as shown in Equation 1.

$$Q = \text{compliance} * [(w)\text{correlation} + (1-w)\text{compatibility}] \quad \text{Eqn. 1}$$

In Equation 1, compliance, correlation and compatibility correspond to criteria considered in the co-location assessment. The term w corresponds to an adjustable weighting factor.

The compliance term quantifies regulations which may govern co-location. The correlation term quantifies the shifting employment needs of the two entities which may affect their ability to share personnel. The compatibility term quantifies the broader needs of each entity by comparing operational priorities. Each of these terms is explained in greater detail below.

Equation 1 may be modified to include additional or alternative criteria in the co-location score.

Compliance analysis measures whether any regulations prohibit two entities from sharing space. Compliance values are assigned to a pair of businesses based on the stringency of the applicable regulations. For example, a relationship may be assigned the number "1" if co-location is permitted, "0" if compliance concerns make co-location impossible, and "0.5" if co-location would be permissible with each business in a separate space (i.e. separated by a removable wall).

Correlation analysis compares the growth rates of two entities. Where one entity is growing while a second is shrinking, co-location allows employees to be shifted between the two as needed. This strategy offers a streamlined way for the successful entity to expand with minimal reorganization.

Head count data for each entity in the pair may be collected for a specified period. For example, monthly head count data for the two entities may be gathered over a period of five years. The data may be compared using pairwise correlation or any other suitable method.

Correlation data may be normalized and inverted to fit on a 0 to 1 scale as shown in Equation 2.

$$\text{Correlation} = [(r_x - 1)/2] + 0.5 \qquad \text{Eqn. 2}$$

In Equation 2, $r_x$ is the correlation coefficient for a pair of entities, and may be determined using any suitable correlation method.

Compatibility analysis measures the probability that the top concerns of two entities are compatible. If two entities share many of their top concerns, they are likely to use both space and personnel in similar ways and are good candidates for co-location.

The group of entities selected for evaluation may first agree on a list of concerns. The concerns may be referred to as critical top qualities ("CTQs"). The CTQs may correspond to their primary concerns in space and personnel management. Examples of CTQs may include employee education level, employee language diversity, wages, shift or seat sharing, paper dependency and infrastructure requirement.

After a list of CTQs is determined, individual members of an entity may prioritize the CTQs using a pairwise comparison worksheet to consider two CTQs at time, head to head. The results are converted into a ranking based on the number of times a particular CTQ was chosen.

The rank orders created by the individuals may be consolidated and converted to a numerical preference for each CTQ representing the entire entity. Each entity will then have a set of data quantifying its preference for each CTQ relative to the other CTQs. The data may be compared using a paired t-test or any other suitable test to determine a probability that the two entities have the same preferences.

The paired t-test described above yields a probability between 0 and 1. A probability of 1 indicates that the pair of entities has statistically identical preferences, while a probability of 0 indicates the pair of entities has opposing preferences and is incompatible.

For each pair of entities, the values of compliance, correlation (see Equation 2) and compatibility (calculated using the paired t-test) are combined as shown in Equation 1 to arrive at a Q value. The Q value is a single number that corresponds to the co-location score for a pairing. The co-location scores may be displayed pictorially in a matrix so that the candidates for co-location are easily visible.

Embodiments of the invention will now be described with reference to FIGS. 1-3.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 201 computer executable instructions may be embodied in hardware or firmware (not shown). As described in detail below, database 121 may provide storage for operational data related to an entity, prioritized CTQs submitted by individuals, values of elements in the co-location assessment, and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Operational data used to determine elements of a co-location score, values of elements of a co-location score, and any other suitable information may be stored in memory 115.

One or more of applications 119 may include one or more algorithms that may be used to perform the assignment or determination of values of elements of the co-location score, the creation of co-location matrices, and any other suitable tasks.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
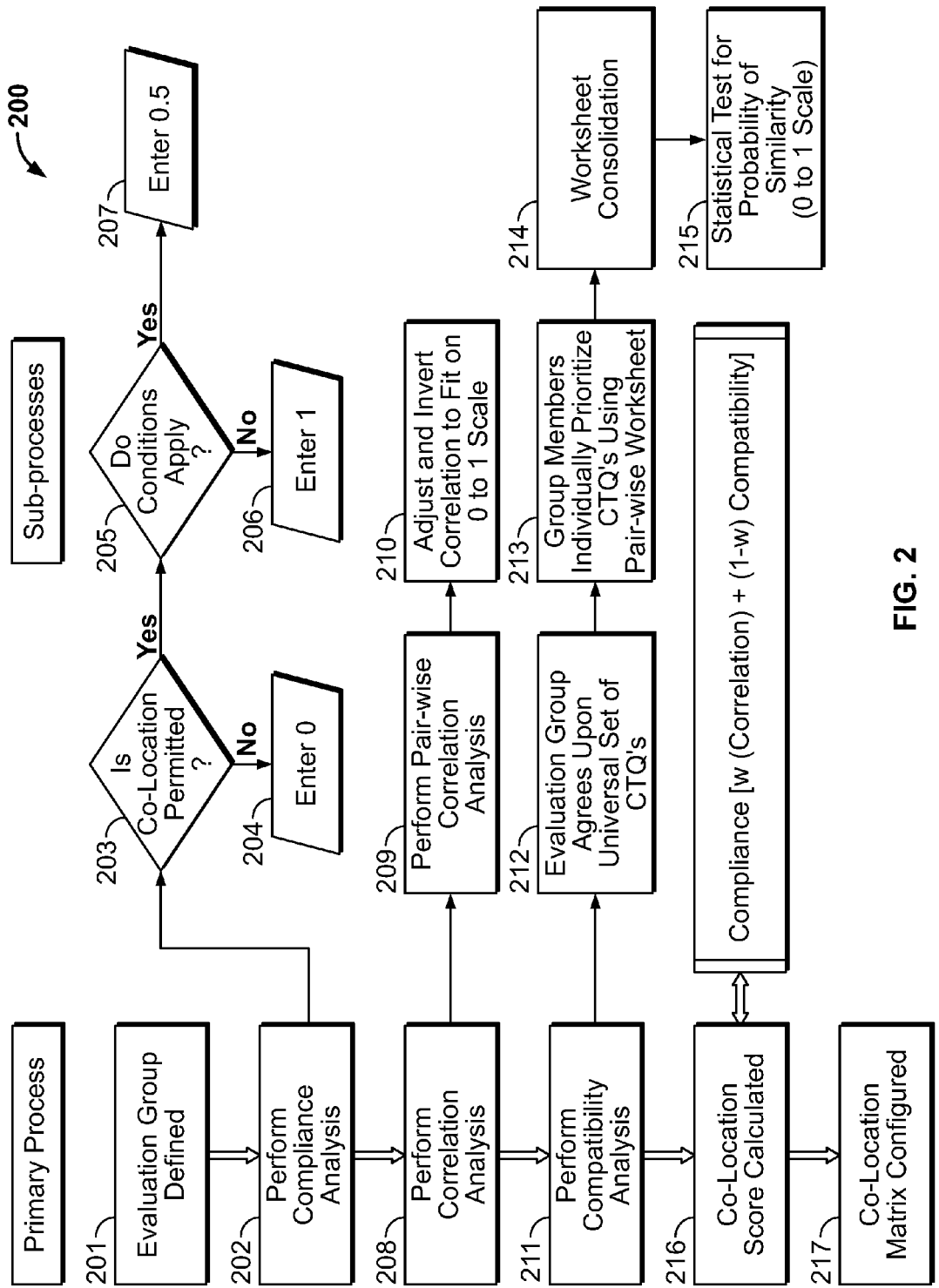
FIG. 2 is a flow diagram of a process in accordance with the principles of the invention.

FIG. 2 shows process 200 for generating a co-location score for a pair of entities. The vertical path shows the primary process in generating the co-location score as defined by Equation 1, above. The horizontal paths in the flow diagram show the subprocesses for determining the value of each factor in the co-location score equation.

At step 201 the group of entities for co-location analysis is defined. At step 202, the compliance term for a pair of entities is determined. Steps 203 through 207 illustrate the subprocess for determining the compliance term. At step 203, the possibility of co-location is determined. If co-location is prohibited, the process continues at step 204, with the compliance term equal to 0. If co-location is permitted the process continues with step 205. At step 205 any conditions on co-location are determined. If no conditions apply, the process continues at step 206, with the compliance term equal to 1. If conditions apply, the process continues at step 207, with the compliance term equal to 0.5.

At step 208, the primary process continues with the determination of the correlation term. Steps 209 and 210 illustrate the subprocess for determining the correlation term. At step 209, pairwise correlation is performed on headcount data for the two entities being assessed. At step 210, the correlation is adjusted and inverted to fit on a 0 to 1 scale.

At step 211, the primary process continues with the determination of the compatibility term. Steps 212 through 215 outline the subprocess for determining the correlation term. At step 212 the group of entities defines a list of top business concerns, labeled critical top qualities (CTQs). At step 213, individual members of an entity prioritize the CTQs using a pairwise comparison worksheet. At step 214, the individual worksheets are consolidated to yield a set of data for each entity quantifying its preferences for the list of CTQs. At step 215, the data sets for the pair of entities are statistically compared using a paired t-test. The compatibility term is equal to the probability of similarity.

At step 216, the co-location score for the pair of entities is calculated using the compliance, correlation and compatibility terms determined above. At step 217, a co-location matrix is configured to display the co-location scores for each pair of entities.

Figure 3:
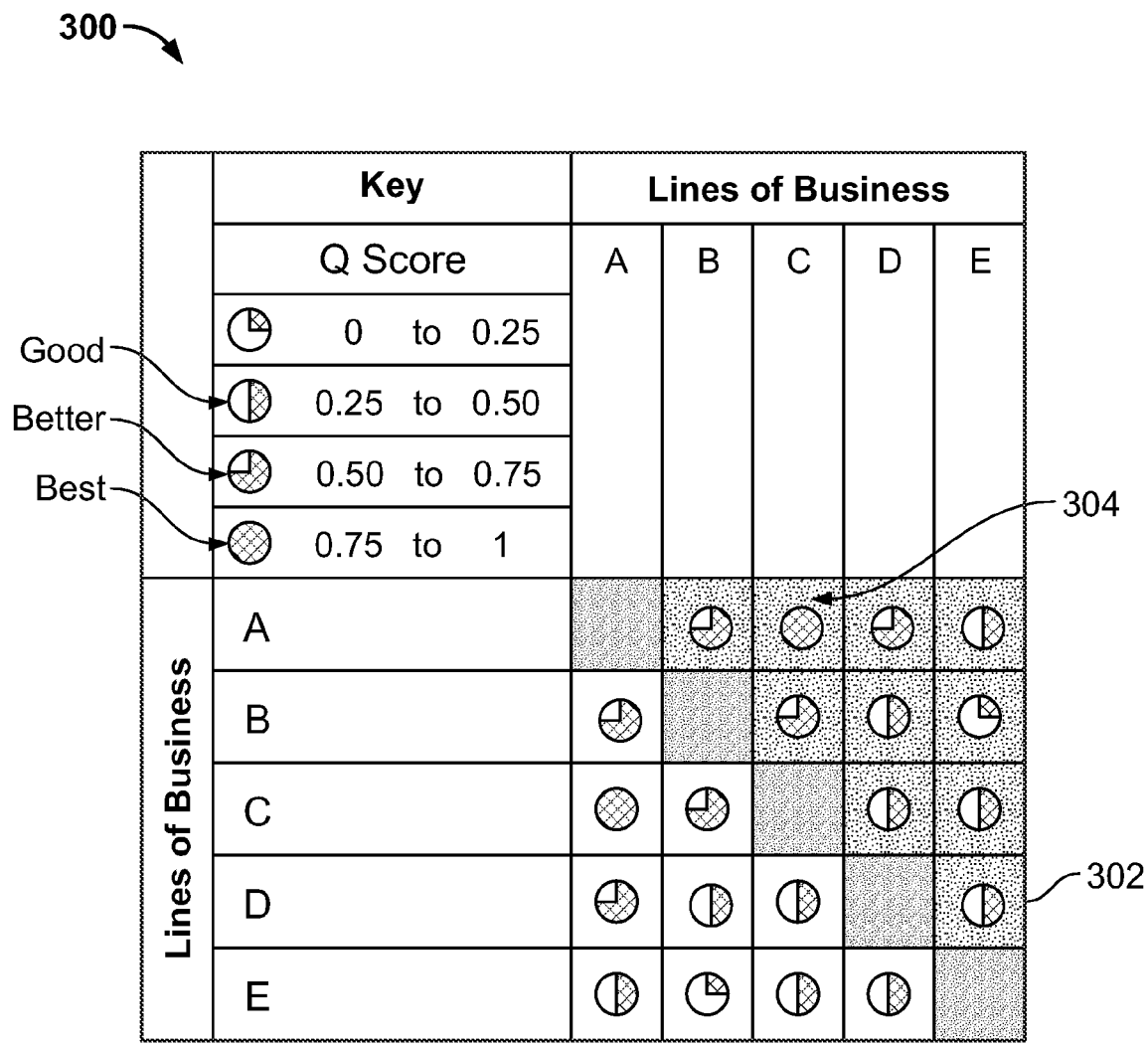
FIG. 3 shows illustrative data corresponding to a portion of the process shown in FIG. 2.

FIG. 3 shows illustrative co-location matrix 300, which may correspond to step 217 in FIG. 2, above. The matrix displays co-location score ranges 302 for five lines of business. Based on this data, lines of business A and C are the best candidates for co-location, because that pairing has the highest Q score, which is shown in cell 304.

Thus, apparatus and methods for electronically evaluating a pair of entities as candidates for co-location are therefore provided. Persons skilled in the art will appreciate that the present invention can be practiced by other than the described embodiments, which are presented for purposes of illustration rather than of limitation, and that the present invention is limited only by the claims that follow.

What is claimed is:

1. A system for electronically scoring a pair of entities as candidates for co-location, the pair comprising a first entity and a second entity, the system comprising:

an input device configured to receive data related to the operations of a the first and second entities;

a processor device configured to calculate a co-location score for the pair of entities, the value depending on the operations data for each entity in the pair; and an output device configured to output a co-location score for the co-location of the first and second entities, the co-location score defined by the equation Q=compliance*[(w)correlation+(1+w)compatibility];

wherein:

Q is the co-location score;

w is a weighting factor;

compliance is a numerical value that is selected to correspond to regulations which govern co-location;

correlation quantifies growth rates of the first and second entities; and compatibility quantifies a probability that critical top qualities of the first and second entities are compatible.

2. The system of claim 1 wherein, when the pair of entities is a first pair of entities and the co-location score is a first co-location score, the processor module is further configured to calculate a plurality of second co-location scores corresponding to a plurality of second pairs of entities.

3. The system of claim 2 wherein the output module is further configured to output a matrix showing the first co-location scores and at least a portion of the second co-location scores.

4. A non-transitory computer usable medium having computer readable program code embodied therein, said computer readable program code adapted to be executed to implement a method for electronically scoring a pair of entities as candidates for co-location, the pair comprising a first entity and a second entity, the method comprising:

receiving data defining a group comprising the first and second entities;

receiving data related to the operations of the first and second entities;

pairing the first and second entities to calculate a co-location score for the pair; and displaying the co-location scores for the pairing in a co-location matrix;
wherein:
the co-location score is defined by the equation Q=compliance*[(w)correlation+(1+w)compatibility];
Q is the co-location score;
w is a weighting factor;
compliance is a numerical value that is selected to correspond to regulations which govern co-location;
correlation quantifies growth rates of the first and second entities; and compatibility quantifies a probability that critical top qualities of the first and second entities are compatible.

5. The medium of claim 4 wherein, in the method, the operations data comprises information regarding regulations governing the co-location of the first and second entities.

6. The medium of claim 4 wherein, in the method, the operations data further comprises information regarding the number of employees of the first and second entities.

7. The medium of claim 4 wherein, in the method, the operations data further comprises information regarding the change in the number of employees of the first and second entities over time.

8. The medium of claim 4 wherein, in the method, the data further comprises information regarding the operational priorities for the first and second entities.

9. The medium of claim 4 wherein, in the method, the data comprises a ranking of the operational priorities, the method further comprising:
determining a list of possible priorities for group of entities under evaluation;
receiving an evaluation of the priorities by an individual member of an entity; and,
using a processor module, consolidating the individual evaluations to generate a single set of data quantifying the preference for each priority for an entity as a whole.

10. The medium of claim 4 wherein, in the method, the method further comprising:
determining whether the first and second entities may be located on the same floor; and
assigning a number that indicates the regulatory status of the pair, the status being selected from the group prohibited, permitted and conditionally permitted.

11. The medium of claim 4 wherein, the method comprises:
comparing the number of employees of each entity over a specified period of time; and
performing a pairwise correlation analysis for the data over the specified time period.

12. The medium of claim 4 wherein, the method comprises:
comparing the operational priorities of the pair of entities;
receiving preference information for the first and second entities for a predetermined list of priorities; and
performing a statistical t-test to assess the probability that the preferences for each entity are similar.

* * * * *